May 16, 1972 H. THOMANN 3,663,440

PIEZOELECTRIC STRUCTURE COMPOSED OF A CLRAMIC FERRO-ELECTRIC MATERIAL HAVING A PEROVSKITE ARRANGEMENT OF COMPONENTS

Filed July 24, 1970

6 Sheets-Sheet 1

INVENTOR

Helmut Thomann

BY Hill Sherman Meroni Gross & Simpson ATTYS.

May 16, 1972 H. THOMANN 3,663,440

PIEZOELECTRIC STRUCTURE COMPOSED OF A CLRAMIC FERRO-ELECTRIC MATERIAL HAVING A PEROVSKITE ARRANGEMENT OF COMPONENTS

Filed July 24, 1970

6 Sheets-Sheet 2

INVENTOR
Helmut Thomann

BY Hill, Sherman, Meroni, Gross & Simpson
ATTYS.

May 16, 1972 H. THOMANN 3,663,440

PIEZOELECTRIC STRUCTURE COMPOSED OF A CERAMIC FERRO-ELECTRIC MATERIAL HAVING A PEROVSKITE ARRANGEMENT OF COMPONENTS

Filed July 24, 1970

6 Sheets-Sheet 3

INVENTOR
Helmut Thomann

BY Hill Sherman Meroni Gross & Simpson

ATTYS.

May 16, 1972 H. THOMANN 3,663,440

PIEZOELECTRIC STRUCTURE COMPOSED OF A CERAMIC FERRO-ELECTRIC MATERIAL HAVING A PEROVSKITE ARRANGEMENT OF COMPONENTS

Filed July 24, 1970 6 Sheets-Sheet 4

INVENTOR

Helmut Thomann

BY Hill, Sherman, Meroni, Gross & Simpson ATTYS.

May 16, 1972 H. THOMANN 3,663,440

PIEZOELECTRIC STRUCTURE COMPOSED OF A CERAMIC FERRO-ELECTRIC MATERIAL HAVING A PEROVSKITE ARRANGEMENT OF COMPONENTS

Filed July 24, 1970

6 Sheets-Sheet 5

INVENTOR
Helmut Thomann

BY Hill, Sherman, Meroni, Gross & Simpson ATTYS.

May 16, 1972 H. THOMANN 3,663,440

PIEZOELECTRIC STRUCTURE COMPOSED OF A CERAMIC FERRO-ELECTRIC MATERIAL HAVING A PEROVSKITE ARRANGEMENT OF COMPONENTS

Filed July 24, 1970

6 Sheets-Sheet 6

INVENTOR
Helmut Thomann

BY Hill, Sherman, Meroni, Gross & Simpson ATTYS.

United States Patent Office 3,663,440
Patented May 16, 1972

3,663,440

PIEZOELECTRIC STRUCTURE COMPOSED OF A CERAMIC FERRO-ELECTRIC MATERIAL HAVING A PEROVSKITE ARRANGEMENT OF COMPONENTS

Helmut Thomann, Munich, Germany, assignor to Siemens Aktiengesellschaft, Berlin and Munich, Germany
Filed July 24, 1970, Ser. No. 58,098
Claims priority, application Germany, July 28, 1969, P 19 38 318.7
Int. Cl. C04b *35/46, 35/48*
U.S. Cl. 252—62.9 7 Claims

ABSTRACT OF THE DISCLOSURE

A piezoelectric structure comprised of a ceramic ferro-electric material having a Perovskite arrangement of components defined by the general formula: 41 through 49 mol percent $PbTiO_3$, 37 through 49 mol percent $PbZrO_3$ and 5 through 18 mol percent $Pb(A_nB_m)O_3$, wherein A and B are both individual and distinct chemical elements, each having a positive valence and $n$ and $m$ are positive numerals, the sum of which equals 1 and the sum of the product of the valence $A^xn$ plus the product of the valence of $B^xm$ is equal to 4. For example, a preferred Perovskite arrangement for a preferred ferro-electric material is $$xPbTiO_3—yPbZrO_3—zPb(Mg_{0.5}W_{0.5})O_3$$

wherein $x$, $y$ and $z$ are numerals the sum of which is equal to 1. The ferro-electric material also includes about 1% of $MnO_2$ and 0.15% $Al_2O_3$ by weight of all of the components. The disclosed structure has an improved electro-mechanical coupling factor $k$, an improved mechanical quality factor Q and an increased dielectric $\epsilon$-value factor, all of which factors are selectively adjustable by selection of individual components and their amounts.

BACKGROUND OF THE INVENTION

Field of the invention

The invention relates to piezoelectric structure, and more particularly to a piezoelectric structure composed of a ceramic and a ferro-electric material having a Perovskite arrangement of components.

Prior art

Piezoelectric structures are known and have found utility as elements in the transformation of electrical energy into mechanical energy and vice-versa, i.e., as in frequency filters. Certain of such known piezoelectric structures consist of a ceramic and ferro-electric material having a Perovskite arrangement of its components, which is relatively complex three-component crystalline matrix system. Generally, the known ferro-electric materials have been formulated on the basis of a lead titanate zirconate system and include minor amounts of additional or supplementary substances. Piezoelectric structures composed of such material have aceptable electro-mechanical coupling factors $k$, acceptable mechanical quality factors Q, and fair dielectric $\epsilon$-value factors. However, particularly pure starting components are required for a production of piezoelectric structures since impurities materially affect the various properties of such structures. Further, the level of impurities must be extremely low since the addition of supplementary substances introduces further impurities, and further affects at least electrical properties of the structure. As a practical matter, it is necessary to utilize at least chemically pure starting components or materials if reproduceable properties are to be obtained since the piezoelectric and dielectric properties are noticeably varied by the inclusion of minor amounts of various supplementary substances.

SUMMARY OF THE INVENTION

The invention provides a piezoelectric structure having an increased electro-mechanical coupling factor $k$, an increased mechanical quality factor Q, and an increased dielectric $\epsilon$-value factor, and allows selective adjustment of these factors by selection of individual components and their amounts.

Generally, the invention provides a piezoelectric structure composed of a ceramic an dferro-electric material having a Perovskite arrangement of components defined by the general formula:

$$PbTiO_3—PbZrO_3—Pb(A_nB_m)O_3$$

wherein A and B are individual and distinct chemical elements, each having a positive valence, and $n$ and $m$ are numerals the sum of which is equal to 1, and the sum of the product of the valence of $A^xn$ plus the product of the valence $B^{xx}m$ is essentially to 4. The ferro-electric material includes about 1% of $MnO_2$ and about 0.15% of $Al_2O_3$, both being based on the total weight of all the components.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
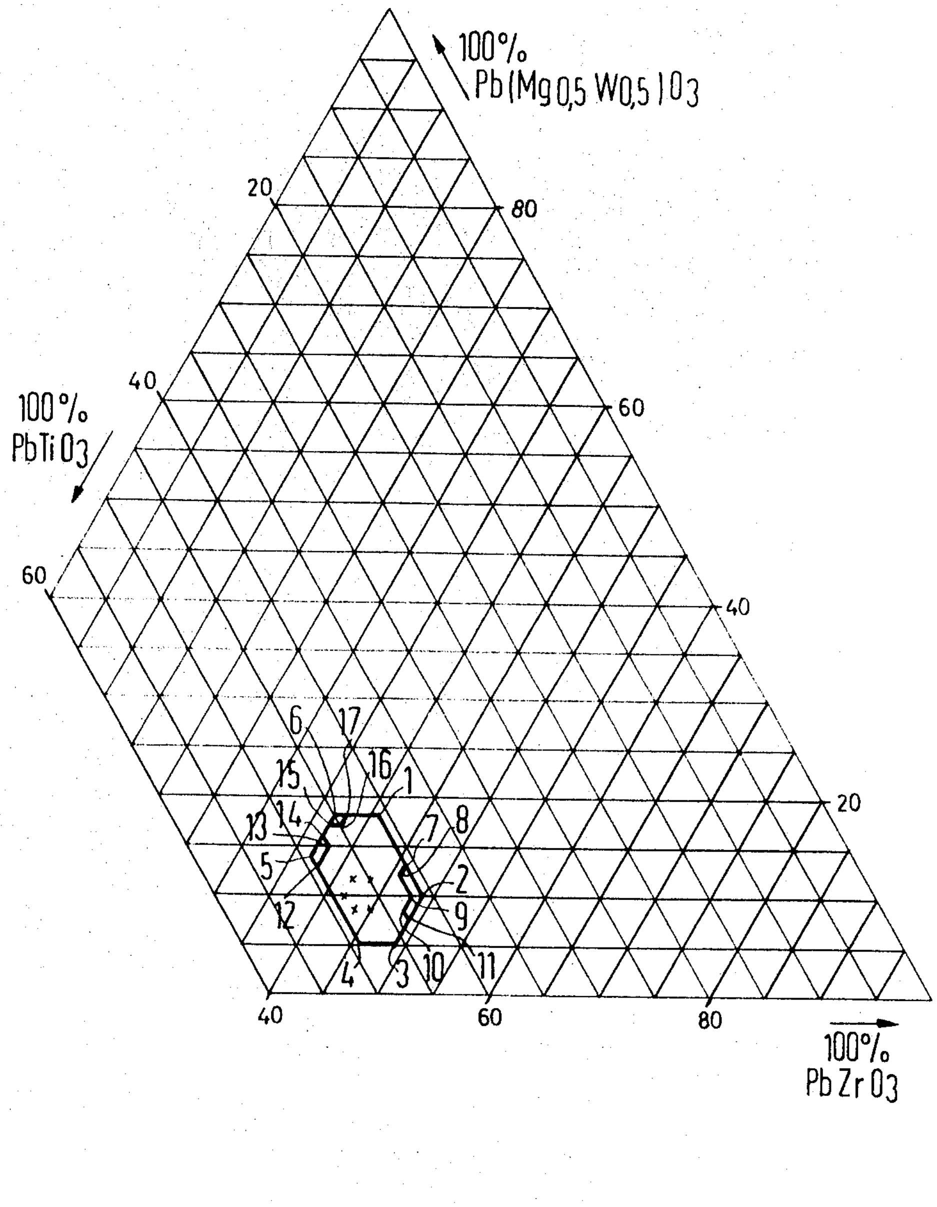
FIG. 1 is a three-component diagram for a particular three-component system illustrating the range of the components for the piezoelectric structure produced in accordance with the principles of the invention.

It has now been found that the heretofore lead titanate zirconate systems can be altered by providing new ferro-electric materials having a Perovskite arrangement of components defined by the general formula:

$$PbTiO_3—PbZrO_3—Pb(A_nB_m)O_3$$

wherein A and B are both individual and distinct chemical elements, each having a positive valence and $n$ and $m$ are numerals (positive), the sum of which is equal to 1, and the sum of the product of the valence of $A^xn$ plus the product of the valence of $B^xm$ is essentially equal to 4. For example, A can be selected from the group consisting of Mn and Mg and other similar elements while B can be selected from the group consisting of Bi, Nb, Sb, Ta and W, and other similar elements.

In accordance with the principles of the invention, the entire or total valence of the various elements or components is balanced in the Perovskite arrangement (i.e. crystalline matrix) so that the valence sum of the components $A+B$ compensates or is essentially equal to the valence of the quadrivalent elements Ti and/or Zr. Thus, a portion of the amount of Ti and/or Zr is replaced by the radical $(A_nB_m)$. For example, the combination of Mn and Sb can be utilized as a substitute for an amount of the aforesaid Perovskite forming components Ti and Zr. In this instance, half of the required valence value is contributed by $Mn^{+3}$, and the other half of the valence value is furnished by $Sb^{+5}$ so that the resultant ferro-electric material has a Perovskite arrangement of components defined by the formula:

$$PbTiO_3—PbZrO_3—Pb(Mn_{0.5}Sb_{0.5})O_3$$

Likewise, a particular component, such as Mn can furnish only ⅓ of the required valence value, while the other component, i.e., Sb, furnished ⅔ of the required valence value. In such a ferro-electric material, the Perovskite arrangement of the components is defined by the formula:

$$PbTiO_3—PbZrO_3—Pb(Mn_{0.33}Sb_{0.67})O_3$$

These principles are also valid for the replacement of amounts of Ti or Zr by, for example, Mg and Nb so that such a ferro-electric material has a Perovskite arrangement of components defined by the formula:

$$PbTiO_3—PbZrO_3—Pb(Mg_{0.33}Nb_{0.67})O_3$$

Of course, various other formulations are also available.

In respect to the last-mentioned three-component system, there have been suggestions that addition of about 0 to 3% by weight of $MnO_2$ and preferably 1%, tend to simultaneously increase the electro-mechanical coupling factor $k$ and the mechanical quality factor Q.

It has now been discovered that corresponding and improved results are achieved in other systems by the inclusion of small amounts of $MnO_2$ and $Al_2O_3$. As indicated before, a number of three-component systems are available and the invention will be described in relation to a particularly preferred system having a Perovskite arrangement of components and defined by the formula:

$$PbTiO_3—PbZrO_3—Pb(Mg_{0.5}W_{0.5})O_3$$

However, it will be appreciated that three-component systems defined by the general formula:

$$PbTiO_3—PbZrO_3—Pb(An_nB_m)O_3$$

(as explained hereinbefore) are within the scope of the invention. Particularly, the invention provides a piezoelectric or electro-mechanical structure which is composed of a suitable ceramic ferro-electric material having a Perovskite arrangement of components, for example, an embodiment as defined by the formula:

$$PbTiO_3—PbZrO_3—Pb(Mg_{0.5}W_{0.5})O_3$$

and which include about 1% $MnO_2$ and about 0.15% $Al_2O_3$, both being by weight of all the components. The presence of these two additional components allows selective adjustment of the properties of the piezoelectric structure and particularly provides improvement in the electro-mechanical coupling factor $k$, the mechanical quality factor Q as well as an increase in the dielectric ε-value factor.

The generally preferred concentration of the components in the aforesaid embodiment is about 41 through 49 mol percent of $PbTiO_3$, 37 through 49 mol percent of $PbZrO_3$, and 5 through 18 mol percent of $$Pb(Mg_{0.5}W_{0.5})O_3$$

and includes about 1% of $MnO_2$ and about 0.15% of $Al_2O_3$, both of which are based on the weight of all the components.

The generally preferred composition of the three-component systems of the invention can be expressed by the following formula, utilizing the aforesaid embodiment:

$$xPbTiO_3—yPbZrO_3—zPb(Mg_{0.5}W_{0.5})O_3$$

wherein $x$, $y$ and $z$ are numerals (positive), the sum of which is equal to 1. Generally, $x$ ranges from about 0.450 to about 0.480, $y$ ranges from about 0.420 to about 0.450, and $z$ ranges from about 0.450 to about 0.480, $y$ ranges from about 0.420 to about 0.450, and $z$ ranges from about 0.085 to about 0.115.

A range of preferred compositions of the embodiment of the three-component systems under discussion is set forth below at Table 1. This table first sets forth the particular values for $x$, $y$ and $z$, for five specific examples, each including about 1% $MnO_2$ by weight and an excess of about 0.4% of PbO. The table then sets forth the individual values of ε, $k$ and Q for each specific example with and without the addition of about 0.15% $Al_2O_3$.

The method of forming the piezoelectric structures of the invention comprises either separately pre-burning or pre-firing the individual lead titanates, lead zirconates and lead-managanese-tungstates or preparing a mixture of such components in an amount sufficient to yield a ferroelectric material within the preferred compositions. When individually pre-fired, the pre-fired components are mixed with a ceramic, the specified amount of $Al_2O_3$ and $MnO_2$ and then subjected to sintering conditions for about two hours at temperatures in the range of 1100° to 1250° C., to achieve a final product. This final product is then subjected to known ceramic method steps to produce a desired structure having a Perovskite arrangement of components. However, it is preferred to pre-fire all the components as a mixture. The individual components are supplied in oxide-yielding form, i.e., either as an oxide per se or as a salt yielding an oxide, such as a carbonate. The mixture is adjusted to contain the desired stoichiometric amount of the various components and pre-fired at temperatures in the range of about 800° to 1,000° C., with additions of one or more components, particularly lead, to compensate for any evaporational losses that occur. Generally, 0.4% of PbO is added to compensate for evaporational losses occurring during the pre-firing and sintering operations. Small amounts of $MnO_2$, i.e. 1% by total weight of components, and $Al_2O_3$, i.e. 0.15% by total weight of components, are added and mixed with the other components. The mixture is then pressed into a shaped body and subjected to sintering conditions for about two hours at temperatures in the range of about 1100° to 1250° C. so as to achieve a final product. Thereafter, known ceramic techniques are utilized to produce a structure having a Perovskite arrangement of components.

TABLE I

Piezoelectric embodiments defined by the formula: $xPbTiO_3$-$yPbZrO_3$-$zPb(Mg_{0.5}W_{0.5})O_3$ including 0.4% PbO (as an additional amount) and 1% $MnO_2$

| | | | Without $Al_2O_3$ | | | With 0.15% of $Al_2O_3$ | | |
|---|---|---|---|---|---|---|---|---|
| $x$ | $p$ | $z$ | ε | $k$ | Q | ε | $k$ | Q |
| 0.465 | 0.420 | 0.115 | 1,600 | 0.46 | 850 | 1,870 | 0.62 | 1,150 |
| 0.450 | 0.435 | 0.115 | 680 | 0.43 | 1,250 | 850 | 0.54 | 1,550 |
| 0.480 | 0.420 | 0.100 | 1,420 | 0.46 | 850 | 1,700 | 0.55 | 1,270 |
| 0.480 | 0.435 | 0.085 | 1,510 | 0.43 | 800 | 1,760 | 0.58 | 1,100 |
| 0.465 | 0.450 | 0.085 | 1,090 | 0.49 | 650 | 1,360 | 0.61 | 800 |

From the values set forth in the above table, it will be readily seen that essential improvements in regard to the electro-mechanical coupling factor *k*, the mechanical quality factor Q, and the dielectric $\epsilon$-value are achieved by the addition of relatively small amounts of $Al_2O_3$.

Such results are surprising and not easily explained, since heretofore $Al_2O_3$ has been regarded as a sintering aid and has often been added in large amounts to various substances being sintered for flux or the like functions. As indicated earlier, other materials, such as $MnO_2$ have been utilized to increase electro-mechanical and electrical properties by direct insertion into the Perovskite matrix, but $Al_2O_3$ does not belong to this class or type of materials.

Thus, the invention provides unexpected results in that essential or material improvements are obtained by the inclusion of the relatively easy-to-handle additions of $Al_2O_3$. Further, as indicated hereinbefore, other ferroelectric materials having a Perovskite arrangement of components as defined by the formula:

$$PbTiO_3—PbZrO_3—Pb(A_nB_m)O_3$$

are also combined with the specified amounts of $MnO_2$ and $Al_2O_3$ to yield similarly improved properties.

Referring now to the drawings, FIG. 1 illustrates a three-component diagram for the system $$PbTiO_3—PbZrO_3—Pb(Mg_{0.5}W_{0.5})O_3$$

The irregular hexagon outlined thereon and defined by the corner points 1, 2, 3, 4, 5 and 6 encompasses the composition range of this embodiment of the invention and it will be appreciated that other three-component systems have similar composition ranges so that one can readily determine the proper amount of each component within the range to achieve a formulation within the scope of the invention. The individual substances which lie within the irregular polygon defined by the straight line connection of points 1, 7, 8, 9, 10, 11, 3, 4, 12, 13, 14, 15, 16 and 17 were extensively studied and were all found to yield improved results. Particularly preferred compositions of the invention are set forth in the above table, however, as will be appreciated, other compositions are also useful in the practice of the invention.

Figure 2:
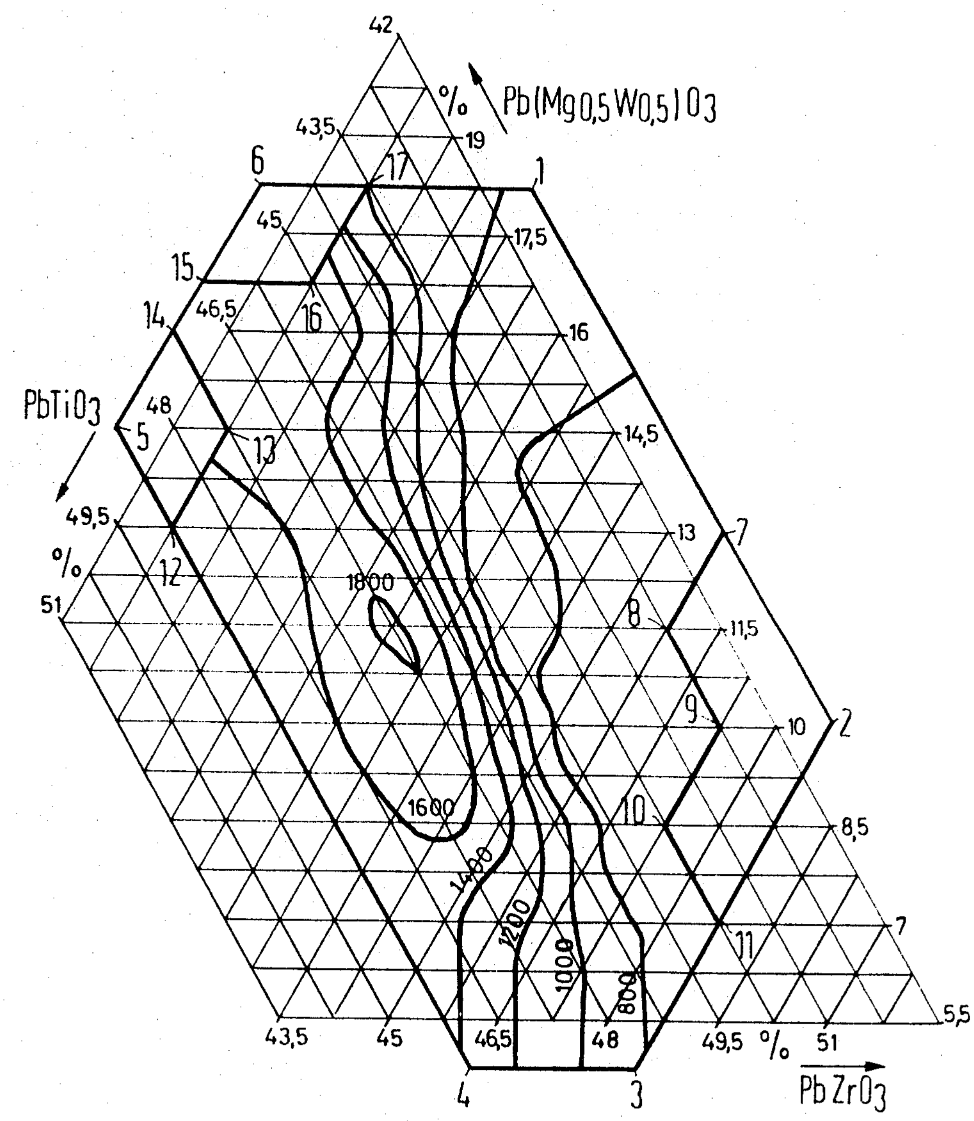
FIG. 2 is an enlarged diagram of the three-component system illustrated at FIG. 1 and illustrates the relative dielectric $\epsilon$-value of piezoelectric structure of the invention sintered at 1150° C.

FIG. 2 illustrates an enlarged view of the irregular hexagon shown at FIG. 1 and shows the relative dielectric constant $\epsilon$-value for the piezoelectric structures having a composition within the hexagon area and which have been sintered (or burned) at 1150° C.

Figure 3:
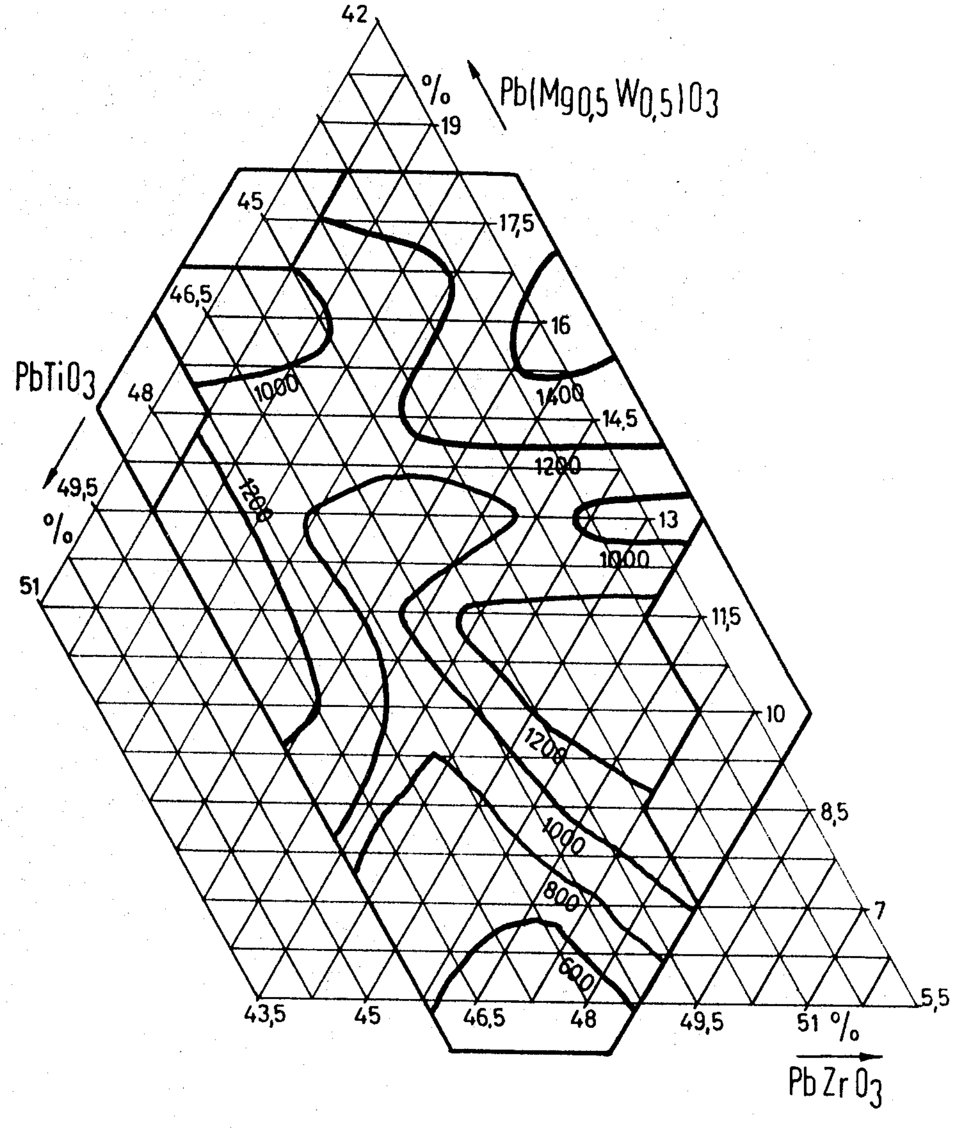
FIG. 3 is also an enlarged diagram of the three-component system illustrated at FIG. 1 and illustrates the mechanical quality factor Q of piezoelectric structures of the invention sintered at 1150 C.

FIG. 3 is a somewhat similar view of the irregular hexagon shown at FIG. 1, but shows the mechanical quality factor Q for the piezoelectric structures having compositions within the encompassed hexagon area, and which have been sintered (or burned) at 1150° C.

Figure 4:
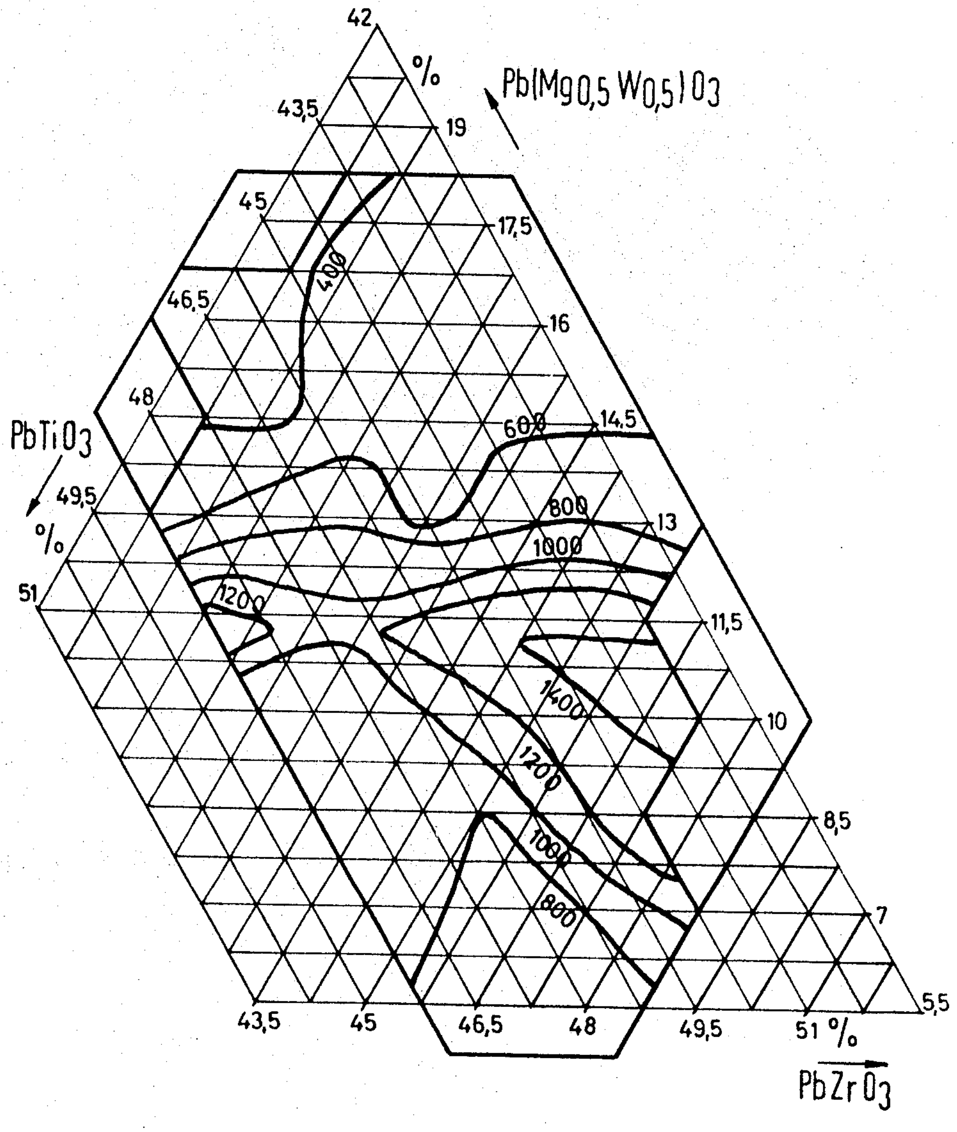
FIG. 4 is an enlarged diagram essentially similar to that shown at FIG. 3 but illustrates the mechanical quality factor Q of piezoelectric structures of the invention sintered at 1200° C.

FIG. 4 is also a somewhat similar view of the irregular hexagon shown at FIG. 1 and shows the mechanical quality factor Q for piezoelectric structures having a composition within the scope of the teachings of the invention and which have been sintered (or burned) at 1200° C.

Figure 5:
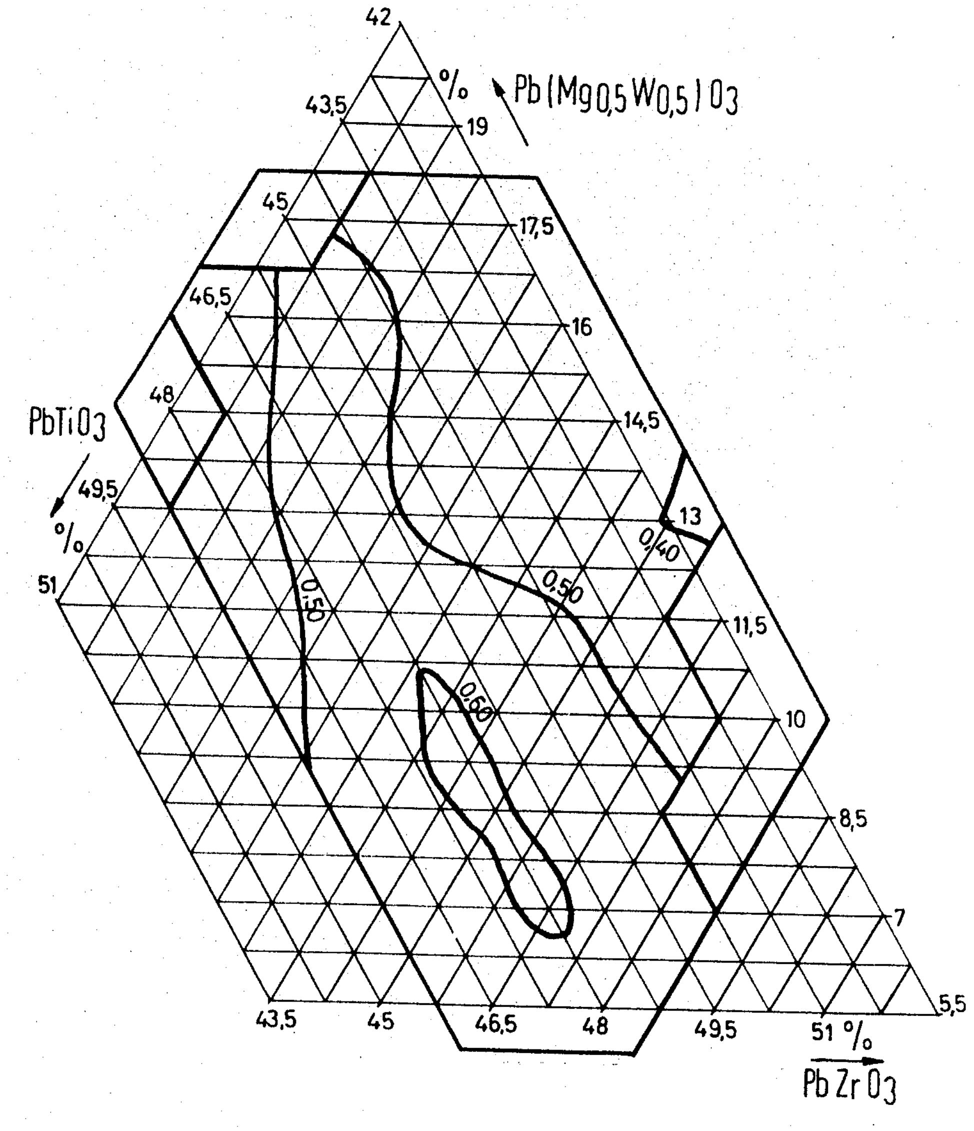
FIG. 5 is an enlarged diagram essentially similar to that shown at FIG. 2 and illustrates the electro-mechanical coupling factor $k$ for piezoelectric structures of the invention sintered at 1150° C.
Figure 6:
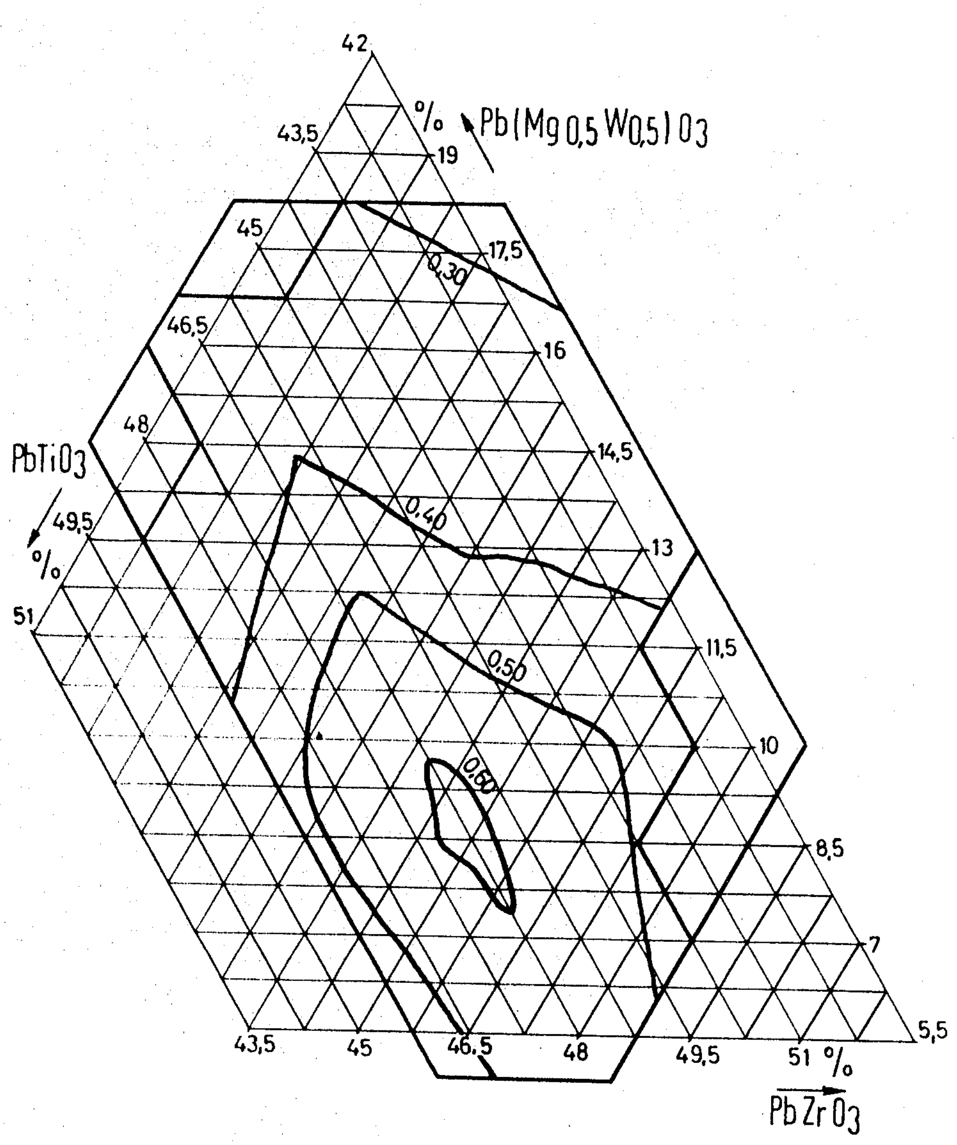
FIG. 6 is an enlarged diagram essentially similar to that shown at FIG. 4 and illustrates the electro-mechanical coupling factor $k$ for piezoelectric structures of the invention sinetred at 1200° C.

FIG. 5 illustrates an enlarged view of the irregular hexagon shown at FIG. 1 and depicts the electro-mechanical coupling factor *k* for piezoelectric structures having a composition within the encompassed hexagon area and which have been sintered (or burned) at 1150° C. FIG. 6 is a somewhat similar view showing the electro-mechanical coupling factor *k* for piezoelectric structures having compositions within the encompassed hexagon area and which have been sintered (or burned) at 1200° C.

Ranges of equal or essentially equal $\epsilon$-values and Q or *k* factors are represented in FIGS. 2 through 6 by the irregular lines, which are enumerated with the respective values of the individual results.

The preferred compositions, as set forth in the above table, can easily be modified or broadened to include other compositions by simple comparison of the individual diagrams. Thus, such modifications allow one to select a particular composition emphasizing a high $\epsilon$-value, a high mechanical quality factor Q and/or a high electro-mechanical coupling factor *k*, or allow one to simultaneously emphasize the optimal values for all three properties, as desired.

It will be understood that modifications and variations may be effected without departing from the spirit and scope of the novel concepts of the present invention.

I claim as my invention:

1. A piezoelectric structure consisting of a ceramic ferroelectric material having a three-component Perovskite arrangement defined by the formula:

$$xPbTiO_3—yPbZrO_3—zPb(Mg_{0.5}W_{0.5})O_3$$

wherein *x*, *y* and *z* are numerals the sum of which is equal to 1, *x* being a numeral ranging from about 0.41 to about 0.49, *y* being a numeral ranging from about 0.37 to about 0.49, and *z* being a numeral ranging from about 0.05 to about 0.18, and about 1% by weight of $MnO_2$ and about 0.15% by weight of $Al_2O_3$, the amounts of said $MnO_2$ and $Al_2O_3$ being calculated on the basis of the total weight of said components.

2. A piezoelectric structure as defined in claim 1 wherein *x* is equal to 0.465, *y* is equal to 0.420 and *z* is equal to 0.115.

3. A piezoelectric structure as defined in claim 1 wherein *x* is equal to 0.450, *y* is equal to 0.435 and *z* is equal to 0.115.

4. A piezoelectric structure as defined in claim 1 wherein *x* is equal to 0.480, *y* is equal to 0.420 and *z* is equal to 0.100.

5. A piezoelectric structure as defined in claim 1 wherein *x* is equal to 0.480, *y* is equal to 0435 and *z* is equal to 0.085.

6. A piezoelectric structure as defined in claim 1 wherein *x* is equal to 0.465, *y* is equal to 0.450 and *z* is equal to 0.085.

7. A piezoelectric structure consisting of a ceramic ferroelectric material having a three-component Perovskite arrangement defined by the formula:

$$xPbTiO_3—yPbZrO_3—zPb(Mg_{0.5}W_{0.5})O_3$$

wherein *x*, *y* and *z* are numerals the sum of which is equal to 1, *x* being a numeral ranging from about 0.450 to about 0.480, *y* being a numeral ranging from about 0.420 to about 0.450 and *z* being a numeral ranging from about 0.085 to about 0.115, and about 1% by weight of $MnO_2$ and about 0.15% by weight of $Al_2O_3$, the amounts of said $MnO_2$ and $Al_2O_3$ being calculated on the basis of the total weight of said components.

References Cited

UNITED STATES PATENTS

| | | | |
|---|---|---|---|
| 3,463,732 | 8/1969 | Banno et al. | 252—62.9 |
| 3,536,625 | 10/1970 | Murakawa et al. | 252—62.9 |

TOBIAS E. LEVOW, Primary Examiner

J. COOPER, Assistant Examiner

U.S. Cl. X.R.

106—39 R